US011972131B2

(12) United States Patent
Sun

(10) Patent No.: US 11,972,131 B2
(45) Date of Patent: Apr. 30, 2024

(54) ONLINE TAKEOVER METHOD AND SYSTEM FOR HETEROGENEOUS STORAGE VOLUME, DEVICE, AND MEDIUM

(71) Applicant: INSPUR SUZHOU INTELLIGENT TECHNOLOGY CO., LTD., Jiangsu (CN)

(72) Inventor: Xianning Sun, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/026,945

(22) PCT Filed: Nov. 30, 2021

(86) PCT No.: PCT/CN2021/134548
§ 371 (c)(1),
(2) Date: Mar. 17, 2023

(87) PCT Pub. No.: WO2022/151856
PCT Pub. Date: Jul. 21, 2022

(65) Prior Publication Data
US 2023/0359384 A1 Nov. 9, 2023

(30) Foreign Application Priority Data

Jan. 13, 2021 (CN) .......................... 202110044015.8

(51) Int. Cl.
*G06F 3/00* (2006.01)
*G06F 3/06* (2006.01)
(52) U.S. Cl.
CPC .......... *G06F 3/0647* (2013.01); *G06F 3/0604* (2013.01); *G06F 3/067* (2013.01)
(58) Field of Classification Search
CPC .................................................... G06F 3/0647
See application file for complete search history.

(56) References Cited

U.S. PATENT DOCUMENTS 5,819,296 A * 10/1998 Anderson ............. G06F 40/123
707/999.102
7,424,592 B1 9/2008 Karr et al.
(Continued)

FOREIGN PATENT DOCUMENTS

CN 1367440 A 9/2002
CN 107704206 A 2/2018
(Continued)

OTHER PUBLICATIONS

Corresponding International Patent Application No. PCT/CN2021/134548, International Search Report, dated Feb. 25, 2022.
(Continued)

*Primary Examiner* — Reginald G Bragdon
*Assistant Examiner* — Michael L Westbrook
(74) *Attorney, Agent, or Firm* — Cooper Legal Group LLC

(57) ABSTRACT

An online takeover method for a heterogeneous storage volume, including: executing a service: a host executing upper layer service data access by means of a second volume label of a storage volume of a second storage; generating a volume label: a first storage taking over the storage volume of the second storage and generating a first volume label for the storage volume that has been taken over; flushing data: flushing host side cache data corresponding to the storage volume of the second storage to the storage volume of the second storage; changing a directory: changing directory information of an upper layer service running on the host; and storage migration: when the directory information of the upper layer service has been changed, migrating data of the storage volume to the first storage.

20 Claims, 2 Drawing Sheets

(56) References Cited

U.S. PATENT DOCUMENTS

| | | | |
|---|---|---|---|
| 9,058,119 B1 | 6/2015 | Ray, III et al. | |
| 2003/0074523 A1 | 4/2003 | Johnson | |
| 2012/0023301 A1* | 1/2012 | Miyagaki .............. | G06F 3/0665 |
| | | | 711/170 |
| 2020/0034077 A1 | 1/2020 | Haravu et al. | |

FOREIGN PATENT DOCUMENTS

| | | |
|---|---|---|
| CN | 111078368 A | 4/2020 |
| CN | 111259020 A | 6/2020 |
| CN | 111580753 A | 8/2020 |
| CN | 112732195 A | 4/2021 |

OTHER PUBLICATIONS

Corresponding International Patent Application No. PCT/CN2021/134548, Written Opinion, dated Feb. 25, 2022.
Corresponding Chinese Patent Application No. 202110044015.8, Notification to Grant Patent Right for Invention dated Jul. 1, 2022.

* cited by examiner

ONLINE TAKEOVER METHOD AND SYSTEM FOR HETEROGENEOUS STORAGE VOLUME, DEVICE, AND MEDIUM

CROSS-REFERENCE TO RELATED APPLICATION

This application claims priority to Chinese Patent Application No. 202110044015.8, filed on Jan. 13, 2021 in China National Intellectual Property Administration and entitled "Online Takeover Method and System for Heterogeneous Storage Volume, Device, and Medium", which is hereby incorporated by reference in its entirety.

FIELD

The present application relates to the technical field of storage devices, in particular to an online takeover method and system for a heterogeneous storage volume, a device, and a medium.

BACKGROUND

For online data migration of heterogeneous storage volumes, there exists one technology as follows. A new storage system connected to a host is connected to an original storage system, device information of the original storage system is acquired and mapped to the host, and a link connected between the new storage system and the host is set as an active link, whereby data is online migrated to the host from the original storage system through the active link, the data of the original storage system is online migrated to the new storage system. This technical solution achieves the online migration of data Logical Unit Number (LUN) on the data link layer and takes the uniqueness of Small Computer System Interface (SCSI) device number into account when establishing the mapping of a correspondence, thereby ensuring the host to identify the new storage system. However, this method needs to update the SCSI device number when processing an upper layer service after the mapping relationship is established. Therefore, there is provided a method capable of implementing the change of an accessed storage volume on the application layer, which replaces the switch to the active link, avoids the conflict problem caused by multi-path compatibility of different storage devices, and features higher applicability than the prior art.

SUMMARY

The present application adopts one technical solution as follows: an online takeover method for a heterogeneous storage volume is provided. The method includes:
 executing a service: a host executing an upper layer service data access by means of a second volume label of a storage volume of a second storage, by this time, the data that the upper layer service accesses in the storage volume of the second storage entering a memory of the host and becoming cache data, that is, host side cache data;
 generating a volume label: in response to the second storage mapping the storage volume of the second storage to a first storage according to a first mapping relationship, the first storage taking over the storage volume of the second storage, the first storage generating a first volume label for the storage volume that has been taken over and sending the first volume label to the host;
 flushing data: flushing the host side cache data corresponding to the storage volume of the second storage to the storage volume of the second storage, whereby the host executes the upper layer service according to the storage volume of the second storage,
 where the first storage accesses the storage volume of the second storage according to the first mapping relationship, and maps the storage volume of the second storage that has been taken over to the host according to a second mapping relationship, the host flushes the host side cache data corresponding to the storage volume of the second storage to the storage volume of the second storage according to the first mapping relationship and the second mapping relationship, and after the flushing data is completed, the upper layer service, when accessing again the storage volume of the second storage, does not put temporary data into the host memory to cache; by this time, the data the upper layer service needs to access all comes from the storage volume of the second storage, that is to say, the storage volume of the second storage has the complete data needed by the upper layer service, and the host executes the upper layer service directly through the storage volume of the second storage skipping the host cache;
 changing a directory: changing directory information of the upper layer service running on the host; and
 storage migration: when the directory information of the upper layer service has been changed, migrating data of the storage volume of the second storage to the first storage.

The step of storage migration may include: determining that the directory information of the upper layer service has been changed, based on which determination, migrating data of the storage volume of the second storage to the first storage.

In some embodiments, the step of generating a volume label includes: the first storage starting an API function, taking over the storage volume of the second storage in response to the second storage mapping the storage volume of the second storage to the first storage according to a first mapping relationship, generating a first volume label for the storage volume of the second storage that has been taken over and sending the first volume label to the host.

In some embodiments, the host side cache data corresponding to the storage volume of the second storage includes first data and second data, the first data being data received by the storage volume after the first storage takes over the storage volume of the second storage, the second data being data received by the storage volume before the first storage takes over the storage volume of the second storage; the step of flushing data includes: the host scanning the storage volume of the second storage that has been taken over by the first storage, and flushing the first data to the storage volume of the second storage.

In some embodiments, the step of changing a directory includes:
 when the host initiates a change of the directory information, disabling the first volume label and enabling the second volume label;
 that is, determining that the host initiates a change of the directory information, based on which determination, disabling the first volume label and enabling the second volume label;
 when the host starts a change of the directory information, writing the first volume label into the directory information of the upper layer service, and disabling the second volume label; and when the host completes a change of the directory information, enabling the first volume label and disabling the second volume label.

That is, determining that the host is starting a change of the directory information, based on which determination, writing the first volume label into the directory information of the upper layer service, and disabling the second volume label; and determining that the host has completed a change of the directory information, based on which determination, enabling the first volume label and disabling the second volume label.

In some embodiments, the step of storage migration includes: migrating the second data of the storage volume of the second storage to the first storage, and sending to the first storage the first data that has been flushed to the storage volume of the second storage.

In some embodiment, the step of migrating the storage volume of the second storage to the first storage further includes: revoking the second volume label of the storage volume of the second storage.

The present application further provides an online takeover system for a heterogeneous storage volume, which is applied to a first storage, a second storage and a host. The system includes: a flush module, a mount module, and an authority module.

The second storage is electrically connected to the host. The first storage is connected to the second storage and the host respectively. The host is provided with the flush module, the mount module, and the authority module.

The second storage is provided with a storage volume and configured to generate a second volume label according to the storage volume.

The first storage is configured to take over the storage volume and generate a first volume label for the storage volume that has been taken over, and send the first volume label to the host.

The flush module is configured to control the host to flush cache information corresponding to the storage volume to the storage volume of the second storage.

The mount module is configured to control a change of directory information of an upper layer service running on the host.

The authority module is configured to control an authority of the first volume label and the second volume label and control the upper layer service to implement the change of the directory information.

In some embodiments, before the mount module initiates the change of the directory information of the upper layer service, the authority module enables the second volume label, the upper layer service implements data interaction by means of the second volume label, and the authority module disables the first volume label;

when the mount module initiates the change of the directory information of the upper layer service, the authority module disables the second volume label and writes the first volume label into the directory information of the upper layer service; and when the mount module completes the change of the directory information of the upper layer service, the authority module disables the second volume label and enables the first volume label.

That is, determining that the mount module is being in a state prior to initiating the change of the directory information of the upper layer service, based on which determination, the authority module enables the second volume label, the upper layer service implements data interaction by means of the second volume label, and the authority module disables the first volume label; determining that the mount module is initiating the change of the directory information of the upper layer service, based on which determination, the authority module disables the second volume label and writes the first volume label into the directory information of the upper layer service; and determining that the mount module has completed the change of the directory information of the upper layer service, based on which determination, the authority module disables the second volume label and enables the first volume label.

The present application further provides a computer device, including a storage and one or more processors, the storage having stored therein a computer-readable instruction that, when executed by the one or more processors, causes the one or more processors to execute the steps of any one of the online takeover methods for a heterogeneous storage volume described above. The present application further provides one or more non-transitory computer-readable storage mediums having stored therein a computer-readable instruction that, when executed by one or more processors, causes the one or more processors to execute the steps of any one of the online takeover methods for a heterogeneous storage volume described above. The present application has one or more embodiments illustrated in detail in the drawings and illustrations hereinafter. Other features and advantages of the present application will become more apparent from the description, drawings and claims appended herein.

BRIEF DESCRIPTION OF THE DRAWINGS

In order to describe the technical solutions in the embodiments of the present application or in the prior art more clearly, drawings required to be used in the illustration of the embodiments or the prior art will be briefly introduced below. Apparently, the drawings in the illustration below are merely some embodiments of the present application. Those ordinarily skilled in the art also might obtain other drawings according to these provided drawings without creative work.

DETAILED DESCRIPTION

The technical solutions of the present application will be clearly and completely described below with reference to the accompanying drawings. Obviously, the described embodiments are only a part of the embodiments of the present application, rather than all the embodiments. Based on the embodiments of the present application, all other embodiments obtained by those ordinary skill in the art without creative work shall fall within the protection scope of the present application.

It should be noted that in the illustration of the present application, for example, LUN represents Logical Unit Number, SCSI represents Small Computer System Interface, SAN represents Storage Area Network, and API represents Application Programming Interface.

Figure 1:
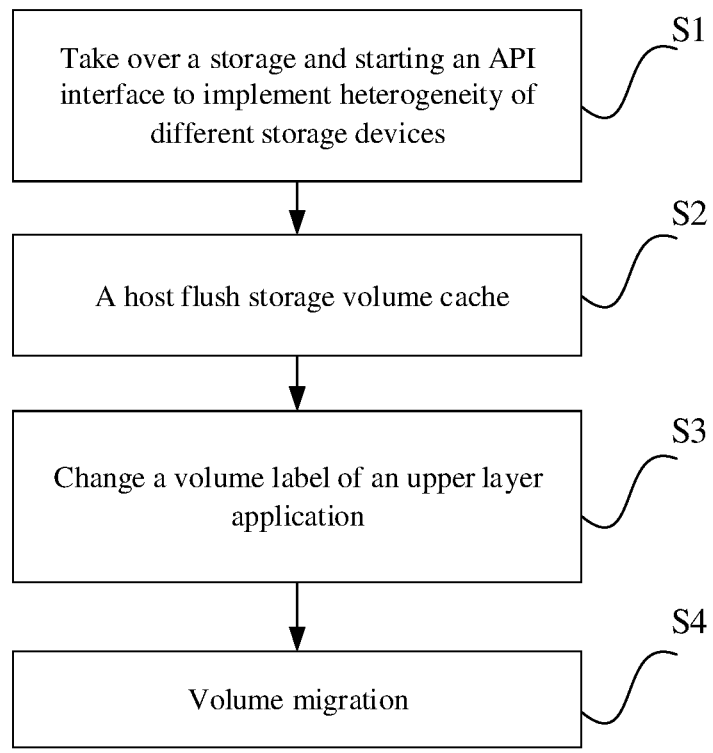
FIG. 1 is a diagram of an online takeover method for a heterogeneous storage volume according to one or more embodiments of the present application.

An embodiment of the present application provides an online takeover method for a heterogeneous storage volume, which, referring to FIG. 1, in some embodiments includes the following steps:

S1: taking over a storage and starting an API interface to implement heterogeneity of different storage devices.

When executing an upper layer service, a host may execute the upper layer service by means of a second volume label of a storage volume of a second storage; in some embodiments, the data of the storage volume is stored in the second volume label of the second storage, and when the upper layer service accesses data, this part of accessed data will be first output to the cache of the host, that is, becoming cache data in the host, and then the host performs read and write access to the cached data. If the storage cluster is changed by this time, the upper layer application might be interrupted or delayed. However, the method provided by the present embodiment may be employed to migrate the data of the storage volume of the second storage to a first storage without the need of interrupting the upper layer application.

Hereinto, the first storage is an introduced new storage, hereinafter referred to as a take-over memory, the second storage is an original storage, hereinafter referred to as a taken-over memory; the upper layer service may be an application layer data read and write access service, for example, database services, file system services, etc. That is, the host performs read and write access to the data inside the storage volume of the original storage based on the volume label of the storage volume of the original storage.

It should be noted that the methods on how to implement heterogeneous virtualization function from the take-over storage to the taken-over storage through an API interface and how to perform data interaction between the take-over storage and the taken-over storage through an SAN line are available technologies, for which no further discussion is needed.

When the take-over storage starts the API interface to the taken-over storage, the taken-over storage maps the storage volume needing to be heterogenized to the take-over storage through the SAN line; after the take-over storage receives a mapping relationship of the heterogenous storage volume, the take-over storage completes data reading from and writing to the heterogenous storage volume through the mapping relationship, then the take-over storage takes charge of the storage volume of the taken-over storage and maps the storage volume under the charge to the host.

S2: a host flushing storage volume cache.

The host, when receiving the storage volume mapping relationship, scans the storage disk of the take-over storage; then, the host starts to use the storage volume of the taken-over storage and starts to flush the cache data of the storage volume inside the host memory. In this way, while processing the upper layer application, the host might store the to-be-flushed cache data of the storage volume inside the host memory into the second storage without interrupting the upper layer application; during the course in which the volume migration is not completed, the memory of the host does not perform any upper layer application processing, preventing the occurrence of incomplete heterogeneous storage volume data during the course of volume migration.

S3: changing a volume label of an upper layer application.

It should be noted that S3 and S2 occur almost at the same time; however, for a clearer illustration, S3 is taken as a separate step, there is no precedence in time sequence between S2 and S3. It also should be noted that the precedence in time sequence between S2 and S3 is not within the scope of protection of the present application. After the host receives the storage volume mapping, the host initiates a volume label change instruction of the upper layer application.

Before the volume label change instruction of the upper layer application is initiated, the host disables the storage volume label of the storage volume under the charge of the take-over storage mapped to the host, and enables the read and write authorities of the storage volume corresponding to the storage volume label directly mapped to the host from the taken-over storage.

When the volume label change instruction of the upper layer application is being initiated, the host disables the storage volume corresponding to the storage volume label directly mapped to the host from the taken-over storage, and writes the storage volume label mapped to the host via the take-over storage into the upper layer application directory.

After the volume label change instruction of the upper layer application has been initiated, the host enables the read and write authorities of the storage volume corresponding to the storage volume label mapped to the host via the take-over storage, and disables the read and write authorities corresponding to the storage volume label directly mapped to the host from the taken-over storage.

S4: volume migration.

After the storage volume label has been written into the directory of the upper layer application in S3, the take-over storage orders the taken-over storage to migrate the storage volume using a volume migration function. The volume take-over process is ended upon the completion of the volume migration. The memory of the host starts again caching the interaction data between the storage volume and the upper layer service.

Through the above steps, the migration of the whole heterogenous storage volume is completed without interrupting the upper layer service. Furthermore, the upper layer application may identify the storage volume label, without extra communication with the host for the label of the SCSI device.

The online takeover method for a heterogeneous storage volume provided in the above embodiment may replace the switching on the link layer with the switching on the application layer, avoiding the conflict problem caused by multi-path compatibility of storage devices between different manufacturers. It is at the host that the data of the storage volume is flushed, which may avoid the interruption or delay of the upper layer application due to the change of the storage cluster.

Figure 2:
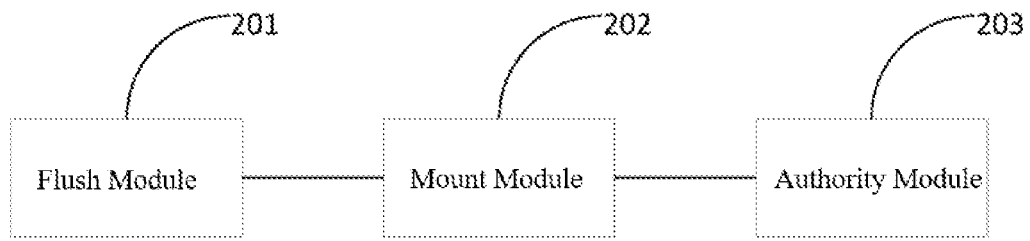
FIG. 2 is a diagram of an online takeover system for a heterogeneous storage volume according to one or more embodiments of the present application.

An embodiment of the present application provides an online takeover system for a heterogeneous storage volume, which, referring to FIG. 2, includes:

a flush module 201, a mount module 202, and an authority module 203.

The flush module 201 is configured to flush the cache in a memory of a host running an upper layer application. It should be noted that, by this time, a taken-over storage maps the storage volume to the host, and a take-over storage also maps the storage volume to the host. However, these two corresponding relationships are different in mapping. Since the taken-over storage maps the storage volume via the take-over storage, plus the label of each SCSI device is different, the mapping relationship is different. When the take-over storage has taken charge of the storage volume of the taken-oven storage, the host scans the storage disk of the take-over storage, and the host undertakes the upper layer service processing and data cache of the take-over storage. In this way, the data integrity of the heterogenous storage volume is guaranteed without interrupting the upper layer service during the migration process.

The mount module 202 is configured to change the storage volume label recorded in the upper layer service directory. The upper layer service needs to use the storage volume label to perform a corresponding task when being executed. Otherwise, the upper layer service cannot learn the positions to read and store the data. When the position of the storage volume changes from the taken-over storage to the take-over storage, the storage volume label changes too; therefore, the upper layer application is required to change the previously stored storage volume label. Through the above method, the volume label might be changed in the upper layer service directory. The specific steps require the cooperation of the authority module 203.

First, before the host initiates the change of storage volume label, the authority module 203 disables the storage volume label mapped to the host via the take-over storage, and enables the storage volume label mapped to the host via the taken-over storage.

Then, when the host is initiating the change of storage volume label, the authority module 203 disables the storage volume label directly mapped to the host from the taken-over storage, writes the storage volume label of the storage volume of the taken-over storage that is under the charge of the take-over storage into the directory of the upper layer application, and by this time, the upper layer application has completed identifying the mapping relationship of the storage volume under the charge of the take-over storage.

Finally, after the host has completed the change of storage volume label, the authority module 203 enables the read and write authorities of the storage volume under the charge of the take-over storage, and disables the read and write authorities of the storage volume directly mapped to the host from the taken-over storage.

The online takeover system for a heterogeneous storage volume provided in the above embodiment may implement the switch between different volume labels corresponding to different mapping relationships between the storage volume and different storage clusters, and the management of authority, and may perfectly implement the switch between different volume labels in the directory information of the upper layer application, without the need of interrupting the upper layer application.

Figure 3:
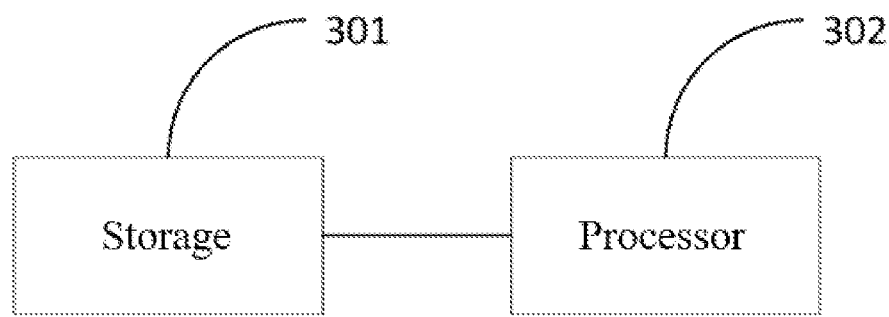
FIG. 3 is a diagram of a computer device according to one or more embodiments of the present application.

An embodiment of the preset application further provides a computer device, which, referring to FIG. 3, includes a storage 301 and one or more processors 302, the storage 301 having stored therein a computer-readable instruction that, when executed by the one or more processors 302, causes the one or more processors 302 to execute the steps of any one of the online takeover methods for a heterogeneous storage volume described above.

In addition to the above storage 301 and processor 302, the computer device further includes a host bus adapter, for example, network cards, Fiber Channel cards, etc., which is configured to connect to a third-party storage system and a host server.

The computer device provided in the above embodiment may implement the generation of storage volume labels of storage volumes in different storage scenarios, and may migrate the storage volume from the second storage to the first storage after the volume label has been changed in the directory information of the upper layer application.

Based on the same inventive concept as the method in the above embodiments, an embodiment of the present application further provides one or more non-transitory computer-readable storage mediums having stored therein a computer-readable instruction that, when executed by one or more processors, causes the one or more processors to execute the steps of any one of the online takeover methods for a heterogeneous storage volume described above.

The non-transitory computer-readable storage medium provided in the above embodiment may implement the change of the directory information of the upper layer application, writing the first volume label into the directory information.

The sequence numbers of the above embodiments disclosed in the present application are merely for the purpose of illustration, rather than indicating the precedence of these embodiments.

The ordinary skill in this field may understand that all or part of the steps of the above embodiments may be completed through hardware, or through related hardware instructed by a program which may be stored in a computer readable storage medium that may include Read-Only Memory (ROM), disk or compact disk, etc.

The above are embodiments of the present application merely and are not intended to limit the patent scope of the present application. Any equivalent structures or equivalent process transformation made according to the description and the accompanying drawings of the present application, or any equivalent structures or equivalent flow modifications applied in other relevant technical fields directly or indirectly are intended to be included in the patent protection scope of the present application.

What is claimed is:

1. An online takeover method for a heterogeneous storage volume, comprising:
   executing, by a host, an upper layer service according to a second volume label of a storage volume of a second storage;
   generating, by a first storage, a first volume label for the storage volume of the second storage and sending the first volume label to the host;
   flushing a cache data of the storage volume of the second storage to the host and executing the upper layer service according to the cache data;
   changing directory information of the upper layer service running on the host; and
   when the directory information of the upper layer service has been changed, migrating the cache data of the storage volume of the second storage to the first storage.

2. The method according to claim 1, wherein the generating, by a first storage, a first volume label for the storage volume of the second storage and sending the first volume label to the host comprises: starting, by the first storage, an application programming interface (API) function, taking over the storage volume of the second storage, generating the first volume label and sending the first volume label to the host.

3. The method according to claim 2, wherein the cache data of the storage volume of the second storage comprises first data and second data, the first data being data received by the storage volume after the first storage takes over the storage volume of the second storage, the second data being data received by the storage volume before the first storage takes over the storage volume of the second storage; and the flushing a cache data of the storage volume of the second storage to the host and executing the upper layer service according to the cache data comprises: scanning, by the host, the storage volume of the second storage that has been taken over by the first storage, and flushing the first data to the storage volume of the second storage.

4. The method according to claim 3, wherein the when the directory information of the upper layer service has been changed, migrating the cache data of the storage volume of the second storage to the first storage comprises: migrating the second data of the storage volume of the second storage to the first storage, and sending to the first storage the first data that has been flushed to the storage volume of the second storage.

5. The method according to claim 4, wherein the migrating the second data of the storage volume of the second storage to the first storage comprises: revoking the second volume label of the storage volume of the second storage.

6. The method according to claim 1, wherein the changing directory information of the upper layer service running on the host comprises:
when the host initiates a change of the directory information, disabling the first volume label and enabling the second volume label;
when the host starts the change of the directory information, writing the first volume label into the directory information of the upper layer service, and disabling the second volume label; and
when the host completes the change of the directory information, enabling the first volume label and disabling the second volume label.

7. The method according to claim 1, wherein data that the upper layer service accesses in the storage volume of the second storage enters a memory of the host and becomes the cache data.

8. The method according to claim 7, wherein generating, by a first storage, a first volume label for the storage volume of the second storage and sending the first volume label to the host comprises:
in response to the second storage mapping the storage volume of the second storage to the first storage according to a first mapping relationship, taking over, by the first storage, the storage volume of the second storage, generating, by the first storage, the first volume label for the storage volume of the second storage that has been taken over and sending the first volume label to the host.

9. The method according to claim 8, wherein the flushing a cache data of the storage volume of the second storage to the host and executing the upper layer service according to the cache data comprises:
the first storage accessing the storage volume of the second storage according to the first mapping relationship, mapping the storage volume of the second storage that has been taken over to the host according to a second mapping relationship, flushing, by the host, the cache data of the storage volume of the second storage to the storage volume of the second storage according to the first mapping relationship and the second mapping relationship, and executing, by the host, the upper layer service directly through the storage volume of the second storage skipping a host cache.

10. The method according to claim 9, wherein the generating, by a first storage, a first volume label for the storage volume of the second storage and sending the first volume label to the host comprises: starting, by the first storage, an application programming interface (API) function, taking over the storage volume of the second storage in response to the second storage mapping the storage volume of the second storage to the first storage according to the first mapping relationship, generating the first volume label for the storage volume of the second storage that has been taken over and sending the first volume label to the host.

11. The method according to claim 10, wherein the cache data of the storage volume of the second storage comprises first data and second data, the first data being data received by the storage volume after the first storage takes over the storage volume of the second storage, the second data being data received by the storage volume before the first storage takes over the storage volume of the second storage; and the flushing a cache data of the storage volume of the second storage to the host and executing the upper layer service according to the cache data comprises: scanning, by the host, the storage volume of the second storage that has been taken over by the first storage, and flushing the first data to the storage volume of the second storage.

12. The method according to claim 9, wherein the changing-a directory information of the upper layer service running on the host comprises:
when the host initiates a change of the directory information, disabling the first volume label and enabling the second volume label;
when the host starts the change of the directory information, writing the first volume label into the directory information of the upper layer service, and disabling the second volume label; and
when the host completes the change of the directory information, enabling the first volume label and disabling the second volume label.

13. An online takeover device for a heterogeneous storage volume, comprising a storage and a processor, the storage having stored therein a computer-readable instruction that, when executed by the processor, causes the processor to perform operations comprising:
executing, by a host, an upper layer service according to a second volume label of a storage volume of a second storage;
generating, by a first storage, a first volume label for the storage volume of the second storage and sending the first volume label to the host;
flushing a cache data of the storage volume of the second storage to the host and executing the upper layer service according to the cache data;
changing directory information of the upper layer service running on the host; and
when the directory information of the upper layer service has been changed, migrating the cache data of the storage volume of the second storage to the first storage.

14. The online takeover device according to claim 13, wherein the generating, by a first storage, a first volume label for the storage volume of the second storage and sending the first volume label to the host comprises: starting, by the first storage, an application programming interface (API) function, taking over the storage volume of the second storage, generating the first volume label and sending the first volume label to the host.

15. The online takeover device according to claim 14, wherein the cache data of the storage volume of the second storage comprises first data and second data, the first data being data received by the storage volume after the first storage takes over the storage volume of the second storage, the second data being data received by the storage volume before the first storage takes over the storage volume of the second storage; and the flushing a cache data of the storage volume of the second storage to the host and executing the upper layer service according to the cache data comprises: scanning, by the host, the storage volume of the second storage that has been taken over by the first storage, and flushing the first data to the storage volume of the second storage.

16. The online takeover device according to claim 15, wherein the when the directory information of the upper layer service has been changed, migrating the cache data of the storage volume of the second storage to the first storage comprises: migrating the second data of the storage volume of the second storage to the first storage, and sending to the first storage the first data that has been flushed to the storage volume of the second storage.

17. The online takeover device according to claim 16, wherein the migrating the second data of the storage volume of the second storage to the first storage comprises: revoking the second volume label of the storage volume of the second storage.

18. The online takeover device according to claim 13, wherein the changing 114 directory information of the upper layer service running on the host comprises:
when the host initiates a change of the directory information, disabling the first volume label and enabling the second volume label;
when the host starts the change of the directory information, writing the first volume label into the directory information of the upper layer service, and disabling the second volume label; and
when the host completes the change of the directory information, enabling the first volume label and disabling the second volume label.

19. A non-transitory computer-readable storage medium having stored therein a computer-readable instruction, wherein the computer-readable instruction, when executed by a processor, causes the processor to perform operations comprising:
executing, by a host, an upper layer service according to a second volume label of a storage volume of a second storage;
generating, by a first storage, a first volume label for the storage volume of the second storage and sending the first volume label to the host;
flushing a cache data of the storage volume of the second storage to the host and executing the upper layer service according to the cache data;
changing directory information of the upper layer service running on the host; and
when the directory information of the upper layer service has been changed, migrating the cache data of the storage volume of the second storage to the first storage.

20. The non-transitory computer-readable storage medium according to claim 19, wherein the changing directory information of the upper layer service running on the host comprises:
when the host initiates a change of the directory information, disabling the first volume label and enabling the second volume label;
when the host starts the change of the directory information, writing the first volume label into the directory information of the upper layer service, and disabling the second volume label; and
when the host completes the change of the directory information, enabling the first volume label and disabling the second volume label.

* * * * *